US012347985B2

(12) United States Patent
Zeng et al.

(10) Patent No.: US 12,347,985 B2
(45) Date of Patent: Jul. 1, 2025

(54) PADDLE CARD AND METHOD FOR MANUFACTURING THE SAME, AND ELECTRICAL CONNECTOR HAVING THE PADDLE CARD

(71) Applicant: Amphenol Commercial Products (Chengdu) Co., Ltd., Chengdu (CN)

(72) Inventors: Tao Zeng, Chengdu (CN); Lei Liao, Shenzhen (CN); Ki Ka Lau, Kowloon (HK)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 443 days.

(21) Appl. No.: 17/824,757

(22) Filed: May 25, 2022

(65) Prior Publication Data

US 2022/0385010 A1 Dec. 1, 2022

(30) Foreign Application Priority Data

May 28, 2021 (CN) ......................... 202110592858.1
May 28, 2021 (CN) ......................... 202121174748.5

(51) Int. Cl.
*H01R 24/60* (2011.01)
*H01R 12/51* (2011.01)
(Continued)

(52) U.S. Cl.
CPC ........... *H01R 24/60* (2013.01); *H01R 12/515* (2013.01); *H01R 12/53* (2013.01); *H01R 12/721* (2013.01);
(Continued)

(58) Field of Classification Search
CPC ...... H01R 24/60; H01R 12/515; H01R 12/53; H01R 12/721; H01R 12/75; H01R 12/51;
(Continued)

(56) References Cited

U.S. PATENT DOCUMENTS 9,466,925 B2 10/2016 Rost et al.
2002/0017397 A1 * 2/2002 Ramey ................ H05K 3/0044 174/262
(Continued)

OTHER PUBLICATIONS

[No Author Listed], SFP-DD Hardware Specification for SFP Double Density 2X Pluggable Transceiver. SFP-DD MSA. Rev 3.0. Apr. 10, 2019. 60 pages.

*Primary Examiner* — Justin M Kratt
(74) *Attorney, Agent, or Firm* — Wolf, Greenfield & Sacks, P.C.

(57) ABSTRACT

A miniaturized paddle card assembly that provides high-speed, high-performance transmission. The paddle card has two or more rows of contact pads for mating with complementary conductors, two or more rows of terminals for cable termination, and alternating dielectric layers and metal layers. The two or more rows of terminals are disposed on respective metal layers. Such a configuration enables conductive traces electrically connecting corresponding contact pads and terminals to be substantially straight, and therefore reduces the lengths of the conductive traces. It is also reduced that the size of the paddle card in both a lateral direction parallel to the rows and a longitudinal direction perpendicular to the lateral direction, without changing the thickness of the paddle card. With the paddle card assembly provided herein, the integrity of the signals transmitted therethrough can be maintained and/or improved at higher speed.

20 Claims, 11 Drawing Sheets

(51) Int. Cl.

| | |
|---|---|
| ***H01R 12/53*** | (2011.01) |
| ***H01R 12/72*** | (2011.01) |
| ***H01R 12/75*** | (2011.01) |
| *H01R 12/55* | (2011.01) |
| *H01R 12/57* | (2011.01) |
| *H01R 12/77* | (2011.01) |
| *H01R 107/00* | (2006.01) |

(52) U.S. Cl.
CPC ............. *H01R 12/75* (2013.01); *H01R 12/51* (2013.01); *H01R 12/55* (2013.01); *H01R 12/57* (2013.01); *H01R 12/72* (2013.01); *H01R 12/77* (2013.01); *H01R 2107/00* (2013.01)

(58) Field of Classification Search
CPC ........ H01R 12/55; H01R 12/57; H01R 12/72; H01R 12/77; H01R 2107/00
See application file for complete search history.

(56) References Cited

U.S. PATENT DOCUMENTS

| | | | | |
|---|---|---|---|---|
| 2012/0129402 | A1* | 5/2012 | Wang ................... | H01R 12/721 439/629 |
| 2020/0301084 | A1* | 9/2020 | Champion ............. | G02B 6/428 |
| 2022/0102919 | A1* | 3/2022 | Doye ................... | G02B 6/4261 |

* cited by examiner

PRIOR ART

PRIOR ART

PADDLE CARD AND METHOD FOR MANUFACTURING THE SAME, AND ELECTRICAL CONNECTOR HAVING THE PADDLE CARD

RELATED APPLICATIONS

This application claims priority to and the benefit of Chinese Patent Application Serial Nos. 202121174748.5 and 202110592858.1, both filed on May 28, 2021. The contents of these applications are incorporated herein by reference in their entirety.

TECHNICAL FIELD

The present disclosure relates to electrical interconnection system, such as those including electrical connectors, used to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. Some electrical connectors include at least one substrate, which may be a printed circuit board that includes electrical conductors. Such printed circuit boards may be referred to as paddle cards.

In a cable assembly including signal cables terminated by a connector configured as a plug that can mate to a connector configured as a receptacle, the paddle card facilitates connections between the cable and terminals within the receptacle connector. An array of surface pads may be provided on a surface of the paddle card near a first side of the paddle card. Conductors within the cables may be soldered to these pads. Contact pads may be provided on the surface of the paddle card near a second side of the paddle card. The second side of the paddle card may be shaped to fit within the receptacle connector where terminals of the receptacle connector press against the contact pads, making electrical connections to the contact pads. The contact pads are often plated with gold, and are sometimes referred to as "gold fingers."

Traces may run through the paddle card, connecting the surface pads to the contact pads. When the terminals of the receptacles connect to the contact pads, signal paths from the cables to the receptacle connector are completed through the paddle card.

Electrical connector designs have been adapted to mirror trends in the electronic industry. Electronic systems have generally become smaller, faster and functionally more complex. These changes mean that the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

BRIEF SUMMARY

Aspects of the present disclosure relate to a paddle card and a method for manufacturing the same, and an electrical connector having the paddle card.

Some embodiments relate to a paddle card. The paddle card may comprise a first surface comprising a first row of terminals for connection to a cable conductor and spaced from a centerline of the paddle card by a first distance; and a second surface facing a same direction as the first surface and spaced from the centerline of the paddle card by a second distance different from the first distance, the second surface comprising a second row of terminals for connection to a cable conductor.

In some embodiments, the first surface may comprise contact pads coupled through the paddle card to the first row of terminals of the first surface and the second row of terminals of the second surface.

In some embodiments, the paddle card may comprise a plurality of conductive traces electrically connecting the contact pads of the first surface to the first row of terminals of the first surface and the second row of terminals of the second surface.

In some embodiments, the plurality of conductive traces may comprise pairs of conductive traces for transmitting differential signals. The conductive traces of each pair may have equal lengths.

In some embodiments, each of the plurality of conductive traces may comprise a first contact end, a second contact end and an intermediate portion between the first contact end and the second contact end. The first contact end is electrically connected to a contact pad. The second contact end is electrically connected to a terminal. The intermediate portion is straight.

In some embodiments, each of the plurality of conductive traces may be straight along at least 85% of its length.

In some embodiments, angles between straight portions of the plurality of conductive traces and the centerline may be within a range of −10 degrees to 10 degrees.

In some embodiments, the paddle card may comprise a plurality of metal layers. The plurality of conductive traces may be distributed in the plurality of metal layers.

In some embodiments, the contact pads of the first surface may comprise a first row of contact pads and a second row of contact pads disposed closer to the first row of terminals. The contact pads in the second row of contact pads may be electrically connected to respective terminals in the first row of terminals.

In some embodiments, the plurality of conductive traces may comprise a conductive trace electrically connecting a contact pad and a terminal that are aligned to each other.

Some embodiments relate to a paddle card. The paddle card may comprise a main body comprising a plurality of dielectric layers and a plurality of metal layers disposed on respective ones of the plurality of dielectric layers; and a first plurality of rows of contact pads and a second plurality of rows of terminals, the first plurality of rows of contact pads and the second plurality of rows of terminals disposed on two opposite ends of the main body, respectively. The second plurality of rows of terminals are on respective metal layers of the plurality of metal layers.

In some embodiments, the plurality of metal layers may comprise a plurality of conductive traces connecting the first plurality of rows of contact pads to the second plurality of rows of terminals.

In some embodiments, the plurality of conductive traces may comprise pairs of conductive traces for transmitting differential signals. Conductive traces of each pair of conductive traces may have equal lengths.

In some embodiments, each of the plurality of conductive traces may be straight along at least 85% of its length.

In some embodiments, the first plurality of rows of contact pads may be coupled through the paddle card to the second plurality of rows of terminals.

Some embodiments relate to a cable assembly. The cable assembly may comprise a paddle card comprising a leading edge, a trailing edge spaced from the trailing edge in a longitudinal direction, a plurality of contact pads comprising a first row of contact pads along the leading edge and a second row of contact pads spaced from the first row in the longitudinal direction, and a plurality of terminals comprising a third row of terminals along the trailing edge and a fourth row of terminals spaced from the third row in a direction opposite the longitudinal direction; a first plurality of cables electrically connected to terminals in the third row; and a second plurality of cables electrically connected to terminals in the fourth row.

In some embodiments, the third row of terminals may be offset from the fourth row of terminals in a transitional direction perpendicular to the longitudinal direction.

In some embodiments, the plurality of terminals may comprise a fifth row of terminals along the trailing edge and a sixth row of terminals spaced from the fifth row in the direction opposite the longitudinal direction. The paddle card may comprise a plurality of metal layers. The third, fourth, fifth, and sixth rows of terminals may be disposed on different ones of the plurality of metal layers.

In some embodiments, the cable assembly may comprise a third plurality of cables electrically connected to terminals in the fifth row; and a fourth plurality of cables electrically connected to terminals in the sixth row.

In some embodiments, the cable assembly may comprise a housing at least partially enclosing the paddle card.

According to an aspect of the present disclosure, a paddle card is provided. The paddle card may comprise a base body, n rows of first contact pads, m rows of terminals and a plurality of conductive traces. The base body may have a first end and a second end that are opposing along a first direction. Then rows of first contact pads may be arranged along a second direction and disposed on a surface of the first end. n≥2 and may be an integer. The second direction may be different from the first direction. The m rows of terminals may be arranged along the second direction and disposed on a surface of the second end. m≥2 and is an integer. The plurality of conductive traces may be disposed inside the base body, and the n rows of first contact pads may be connected to the m rows of terminals through the plurality of conductive traces.

In some embodiments, the first direction may be perpendicular to the second direction.

In some embodiments, one or more pairs of the plurality of conductive traces may be differential pairs of conductive traces for transmitting differential signals, and two conductive traces of each differential pair of conductive traces may have equal length.

In some embodiments, each of the plurality of conductive traces may comprise a first connecting end, a second connecting end and an intermediate section connected between the first connecting end and the second connecting end, the first connecting end may be electrically connected to a first contact pad, the second connecting end may be electrically connected to a terminal, and the intermediate section may be straight.

In some embodiments, at least 85% of each of the plurality of conductive traces may be straight.

In some embodiments, angles between straight portions of the plurality of conductive traces and the first direction may be within a range from −10 degree to 10 degrees.

In some embodiments, the plurality of conductive traces may be distributed in a plurality of layers to form a plurality of conductive trace layers, and the first direction and the second direction may be parallel to the conductive trace layers.

In some embodiments, m=n, and each row of the m rows of first contact pads may be correspondingly electrically connected to one row of the n rows of terminals, respectively.

In some embodiments, along the first direction, a row of first contact pads that is closer to the inside of the base body may be electrically connected to a row of terminals that is closer to the inside of the base body, and a row of first contact pads that is closer to the outside of the base body may be electrically connected to a row of terminals that is closer to the outside of the base body.

In some embodiments, a first contact pad and a terminal electrically connected to each other through one conductive trace may be aligned along the first direction.

In some embodiments, the paddle card may be configured for a plug electrical connector, and the first end may be a plug-in end of the paddle card.

In some embodiments, the n rows of first contact pads may be gold fingers, and the m rows of terminals may be configured for connecting cables.

In some embodiments, the second end may be of a stair-step shape, and each stair-step may have a row of terminals disposed thereon.

According to another aspect of the present disclosure, a paddle card is provided. The paddle card may comprise a main body. The main body may comprise a plurality of dielectric layers and a plurality of patterned metal layers that are alternatively laminated. The plurality of patterned metal layers may comprise outer patterned metal layers positioned on surfaces of the outermost dielectric layers and inner patterned metal layers positioned between adjacent dielectric layers, and the inner patterned metal layers may be connected to the outer patterned metal layers through conductive vias. The outer patterned metal layers may form n rows of first contact pads and m rows of terminals. The n rows of first contact pads and the m rows of terminals may be positioned on two ends of the main body that are opposing along a first direction, respectively. The outer patterned metal layers forming different rows of terminals may be positioned on different layers.

In some embodiments, the inner patterned metal layers may comprise a plurality of conductive traces, two ends of the plurality of conductive traces may be connected to the n rows of first contact pads and the m rows of terminals through the conductive vias, respectively.

In some embodiments, one or more pairs of the plurality of conductive traces may be differential pairs of conductive traces for transmitting differential signals, and two conductive traces of each differential pair of conductive traces may have equal lengths.

In some embodiments, at least 85% of each of the plurality of conductive traces may be straight.

In some embodiments, a first contact pad and a terminal electrically connected to each other through one conductive trace may be aligned along the first direction.

In some embodiments, m=n, and each row of the m rows of first contact pads may be correspondingly electrically connected to one row of the n rows of terminals, respectively.

In some embodiments, along the first direction, a row of first contact pads that is closer to the inside of the main body may be electrically connected to a row of terminals that is closer to the inside of the maim body, and a row of first contact pads that is closer to the outside of the main body may be electrically connected to a row of terminals that is closer to the outside of the main body.

According to yet another aspect of the present disclosure, an electrical connector is provided. The electrical connector may comprise the paddle card as mentioned above, m rows of cables and a housing assembly. The m rows of cables may connect to the m rows of terminals, respectively. The housing assembly may enclose the second end of the base body and connecting ends of the m rows of cables connected to the m rows of terminals.

According to still another aspect of the present disclosure, a method for manufacturing a paddle card is provided. The method for manufacturing the paddle card may comprise forming a metal layer on a dielectric layer; patterning the metal layer to form a patterned metal layer; and stacking a plurality of dielectric layers each provided with a patterned metal layer thereon, and joining the plurality of dielectric layers together to form a main body. Outer patterned metal layers positioned on surfaces of the main body may form n rows of first contact pads and m rows of terminals, and the n rows of first contact pads and the m rows of terminals may be positioned on two ends of the main body, respectively.

In some embodiments, the outer patterned metal layers forming different rows of terminals may be positioned on different layers.

In some embodiments, inner patterned metal layers positioned in the main body may comprise a plurality of conductive traces. The method may further comprise forming conductive vias on the plurality of dielectric layers to connect two ends of the plurality of conductive traces to then rows of first contact pads and the m rows of terminals, respectively.

These techniques may be used alone or in any suitable combination. The foregoing summary is provided by way of illustration and is not intended to be limiting.

BRIEF DESCRIPTION OF DRAWINGS

The following accompanying drawings of the present disclosure are used here as a part of the present disclosure for understanding the present disclosure. The embodiments and their descriptions of the present disclosure are illustrated in the accompanying drawings to explain the principle of the present disclosure. The accompanying drawings are not intended to be drawn to scale. In the drawings.

Figure 1:
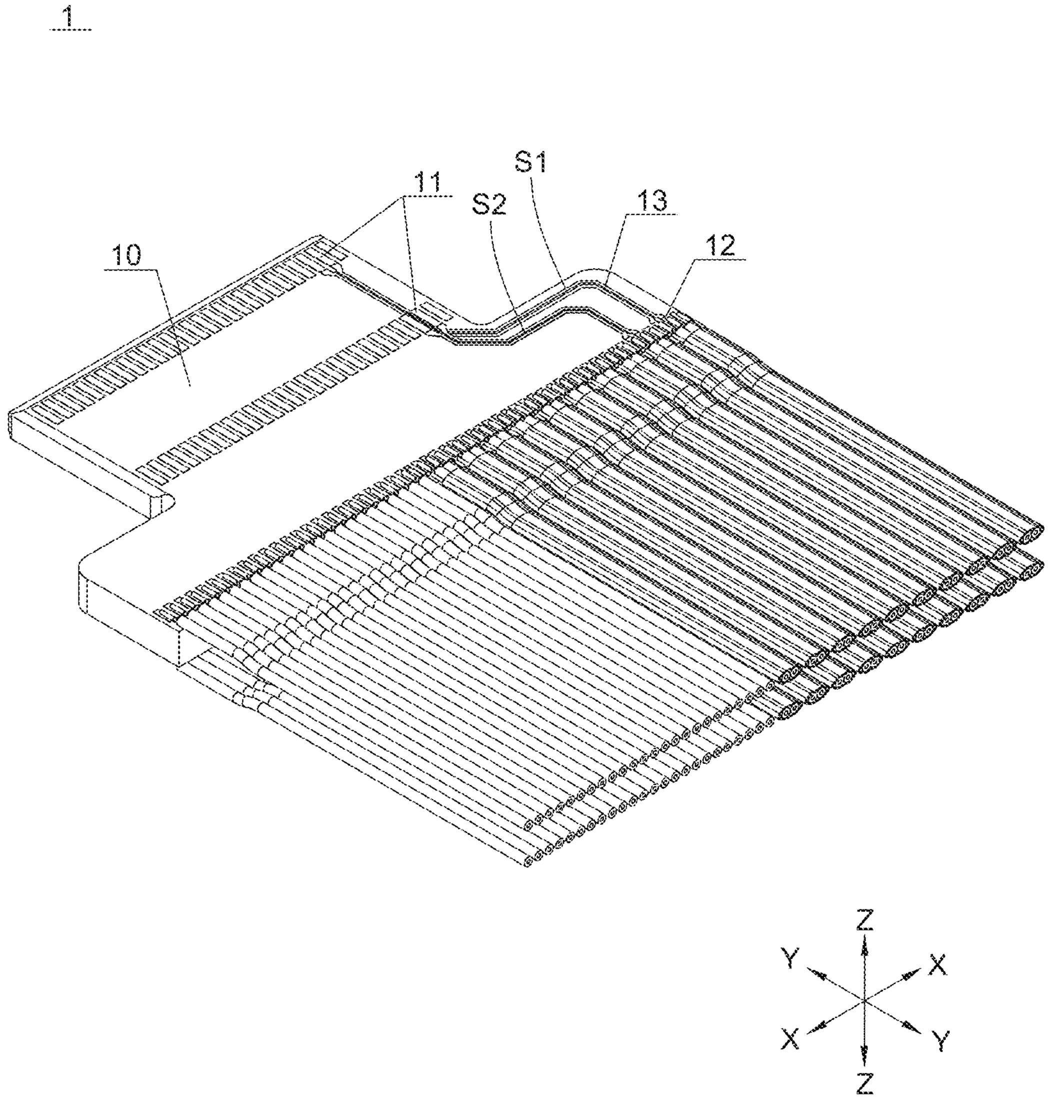
FIG. 1 is a perspective view of a portion of a conventional electrical connector.

The accompanying drawings include the following reference numerals:

1. plug electrical connector; 10. paddle card; 11. gold finger; 12. terminal; 13. conductive trace; 100. paddle card; 200. base body; 210. first end; 220. second end; 221. stair-step; 310. contact pad; 320. terminal; 400. conductive trace; 410. first connecting end; 420. second connecting end; 430. intermediate section; 500. cable; 600, 600'. housing assembly; 710. dielectric layer; 720. patterned metal layer; 730. conductive through-hole; 740. centerline; 750. first surface; 760. second surface; 770. first row of terminals; 780. second row of terminals; 800. mating electrical connector.

DETAILED DESCRIPTION

The inventors have recognized and appreciated designs for paddle cards assemblies that may be used in cable assemblies to support high-speed, high-performance transmission. The inventors have recognized and appreciated that current systems with more complex functions may cause paddle cards to have larger surface areas for providing the increased number of terminals for connection of cables to the paddle card. Further, the longest traces within the paddle card may also be longer as the number of terminals to connect to cables is increased because the array of terminals may be lengthened. Having longer traces as well as more variation between the longest and shortest traces may cause signal integrity deterioration. The inventors have recognized and appreciated techniques to provide paddle cards with reduced width, compared with conventional designs, to support the increased number of contact terminals with less impact on the length of the longest trace between a terminal and a contact pad.

In some embodiments, a paddle card may have two or more rows of contact pads for mating with complementary conductors, two or more rows of second pads for cable termination, and alternating dielectric layers and metal layers. The two or more rows of terminals may be disposed on respective metal layers. Such a configuration may enable conductive traces electrically connecting corresponding first and terminals to be substantially straight, and therefore reduce the lengths of the conductive traces. It may also reduce the size of the paddle card relative to paddle cards of conventional design in a lateral direction parallel to the rows. Alternatively or additionally, the size of a paddle card may be reduced in a direction perpendicular to the lateral direction and aligned with the direction in which the paddle card is inserted into a receptacle connector. These reductions in dimensions may be achieved without changing the thickness of the paddle card. With the paddle card assembly provided herein, the integrity of the signals transmitted therethrough can be maintained and/or improved at higher speed.

Figure 2:
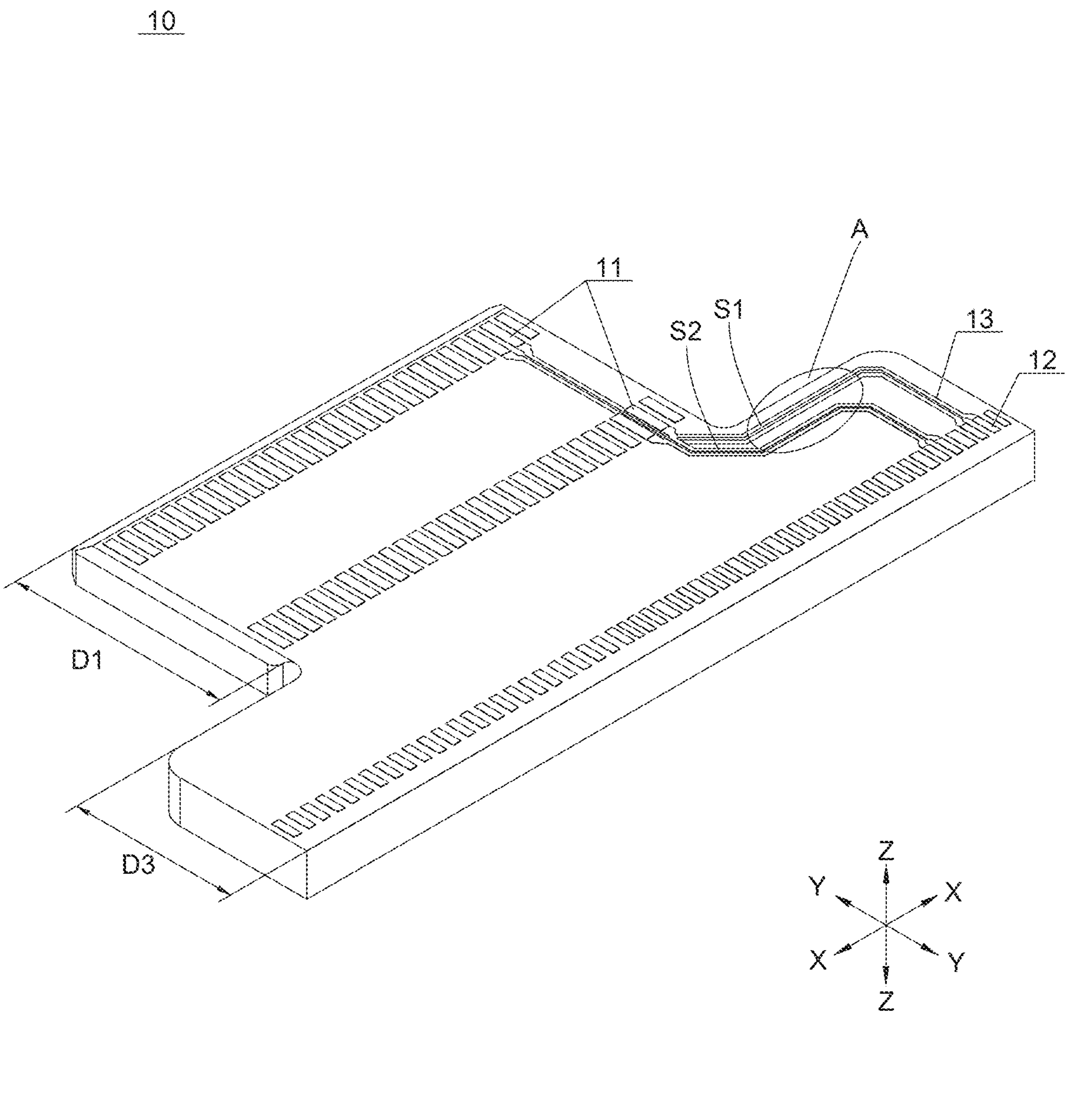
FIG. 2 is a perspective view of a paddle card of the portion of the electrical connector of FIG. 1.

FIGS. 1-2 show conventional designs. As illustrated, a front end (i.e., a plug-in end) of a paddle card 10 of a currently existing plug electrical connector 1 has two rows of gold fingers 11 and its rear end has one row of terminals 12, which certainly lead to that a size of the rear end of the paddle card 10 is larger than that of the front end, forming a structure of a shape similar to T-shape. At the rear end, conductive traces 13 connected to the contact pads at an edge have to bend. Moreover, the closer the terminals 12 are to the edge, the more apparent the bending is, and the longer the conductive traces 13 connected thereto are.

The inventors have recognized and appreciated that signal distortion is usually a function of signal frequency, with more distortion occurring at higher signal frequencies. Shortening transmission distance may reduce a probability of occurrence of signal distortion during transmission. An increase in the distance of signal transmission may increase the probability of occurrence of signal distortion during transmission. Therefore, the increased length of the conductive traces 13 connected to the terminals 12 at the edge may be a factor influencing signal integrity.

The plug electrical connector 1 may be used for transmitting differential signals. The conductive traces 13 in the paddle card 10, such as differential pair of conductive traces S1 and S2, are connected to differential signal cables (for example, cables at the right side of FIGS. 1-2) in pairs. Under the background of miniaturization of products, crosstalk may occur between two adjacent pairs of conductive traces 13. In order to avoid a size D3 of the rear end of the paddle card 10 along a direction illustrated by Y-Y being too large, within a region A at the bending, a spacing between two adjacent pairs of conductive traces 13 is the smallest, such that crosstalk may occur at this position. This may be another factor influencing signal integrity. In order to balance between a relative small D3 and a relatively good anti-crosstalk performance, for a double density 0.80 mm connector, a size D1 of the front end of the paddle card 10 along the direction illustrated by Y-Y is generally about 13 millimeters, whereas D3 is generally about 8.5 millimeters.

Yet another type of distortion is skew, comprising differential inter-pair skew and differential intra-pair skew. Skew is a change in the timing relationship between two differential signals, which are supposed to be correlated in time. Skew can happen when there is a difference in the length of the conductive traces 13 that carry those two differential signals. It takes longer for a differential signal to travel through longer traces, so two differential signals that start out correlated in time will be less correlated after passing through the plug electrical connector 1. Making the conductive trace lengths more uniform reduces inter-pair skew. Intra-pair skew is similar to inter-pair skew, but relates to a differential pair of conductive traces that carries one differential signal. Ideally, the signals on each pair will be 180 degrees out of phase. This means the signals are opposite of each other, and make the biggest possible difference between the signals on each differential pair of conductive traces. If one trace of the differential pair is longer, the signals that make up the differential signal change in phase, and the difference between them gets smaller. With reference to FIG. 2, lengths of two conductive traces in each differential pair of conductive traces (for example, S1 or S2) having bending are obviously different. This may be yet another factor influencing signal integrity.

The inventors have recognized and appreciated miniaturized paddle card assemblies that provide transmission with maintained and/or improved signal integrity at higher speed. A paddle card 100 of the embodiment of the present disclosure is described in detail below in connection with FIGS. 3-5. The paddle card 100 may comprise a base body 200, contact pads 310, terminals 320 and conductive traces 400.

The paddle card 100 may be for a plug electrical connector. A portion of the paddle card 100 may protrude out of a housing of the plug electrical connector. When mating with a receptacle electrical connector, the protruding portion of the paddle card 100 may be inserted into the receptacle electrical connector, and contact pads on the protruding portion may be electrically connected to the contact pads of the receptacle electrical connector. The receptacle electrical connector may be mounted on another printed circuit board, on which a processor or other electronic components may be disposed.

A base body 200 has a first end 210 and a second end 220 that are opposing along a first direction Y-Y. In some embodiments, the first end 210 of the base body 200 may be a plug-in end of the plug electrical connector. Under this circumstance, the first end 210 is a protruding portion of the paddle card 100. The plug electrical connector may connect the first end 210 to other circuits by means of plugging into a receptacle electrical connector, which is easy and convenient to operate. If possible, the paddle card 100 may also be used in a receptacle electrical connector or any other appropriate electrical connectors. In this case, the base body 200 may take any other appropriate configuration. In some embodiments, the second end 220 of the paddle card 100 may be connected to an edge of additional printed circuit board. It may also be connected to one end of a cable 500. The other end of the cable 500 may be used to connect to other components at another location within an electronic system. In some embodiments, the first direction Y-Y may be a longitudinal direction of the base body 200. When the paddle card 100 is used in the plug electrical connector, the first direction Y-Y may be a plug direction of the paddle card 100.

A surface of the first end 210 may be provided with a plurality of contact pads 310. The plurality of contact pads 310 may be in various types, e.g., gold fingers, conductive elastic sheets, etc. that are well-known to those skilled in the art or may appear in the future. The plurality of contact pads 310 may be arranged into n rows. n≥2 and is an integer. Each row of contact pads 310 may be arranged along a second direction X-X. The second direction X-X is different from the first direction Y-Y. An angle between the second direction X-X and the first direction Y-Y may be arbitrary. In some embodiments, the second direction X-X may be a transverse direction of the base body 200. Spacings between contact pads 310 in each row, and the numbers and types of each row of contact pads 310 may be the same or different. Contact pads 310 that are not in the same row may be the same or different. The first end 210 may be substantially the same as a front end of the paddle card 10 of the plug electrical connector 1. For a double density 0.80 mm connector, a size D2 of the first end 210 along the first direction Y-Y may be between 12.5-13.5 millimeters.

A surface of the second end 220 may be provided with a plurality of terminals 320. The plurality of terminals 320 may be in various types, e.g., gold fingers, conductive elastic sheets, welding pads, etc. that are well-known to those skilled in the art or may appear in the future. The contact pads 310 and the terminals 320 may be the same or different. The plurality of terminals 320 may be arranged into m rows. m≥2 and is an integer. Each row of terminals 320 may be arranged along the second direction X-X. Spacings between the terminals 320 in each row, and the numbers and types of each row of terminals 320 may be the same or different. Terminals 320 that are not in the same row may be the same or different.

Figure 5:
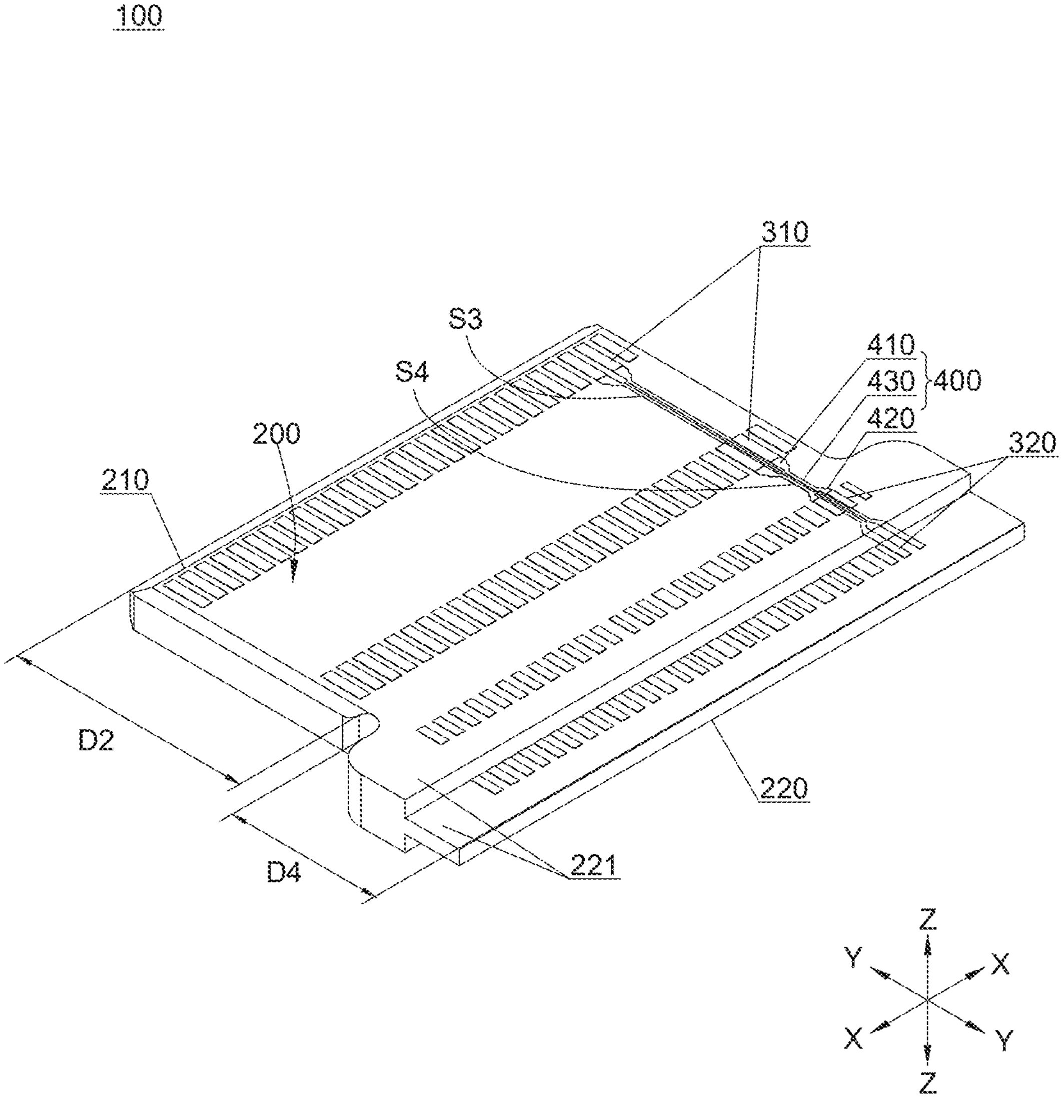
FIG. 5 is a perspective view of the paddle card of FIG. 4, illustrating conductive traces inside the paddle card.

The conductive traces 400 may be in various types that are well-known to those skilled in the art or may appear in the future. The conductive traces 400 may be disposed inside the base body 200. The contact pads 310 may be electrically connected to the terminals 320 through conductive traces 400. The conductive traces 400 may be straight or approximately straight. Being approximately straight refers to that first connecting ends 410 and/or second connecting ends 420 of the conductive traces 400 may have certain bending. However, a relatively long intermediate section 430 is straight, as illustrated in FIG. 5. They will be described in detail hereinafter.

As known by those skilled in the art, the conductive traces 400 are electrically connected between the contact pads 310 and the terminals 320, such that signal can be transmitted between the contact pads 310 and the terminals 320. The signals may comprise GND signals, power signals, control instruction signals, clock signals, and/or data signals, etc.

With reference to FIGS. 1-2 in combination, for a current double density 0.80 mm connector, spacing between the gold fingers 11 of the plug electrical connector 1 is generally about 0.8 millimeter. The plug electrical connector 1 has only one row of terminals 12. Since the terminals 12 normally need to connect with components, such as cables or pins, spacing between the terminals 12 are dependent on sizes of the components. That is to say, space occupied by each of the terminals 12 may not be sufficiently small. It causes that the second end of the base body 200 has a relatively large size along the second direction X-X. On the basis of this, conductive traces 13 (for example, S1 and S2), which are connected to contact pads of the terminals 12 that are close to the two sides, need to be bent. In some embodiments, S1 may have a length between 23.5-24.5 millimeters; and S2 may have a length between 13-14 millimeters. In order to prevent crosstalk between conductive traces 13, there should be enough spacing between the conductive traces 13. It causes that the second end of the paddle card 10 has a relatively large size D3 long the first direction Y-Y. Consequently, the paddle card 10 has relatively large sizes along both the first direction Y-Y and the second direction X-X.

In the paddle card 100 according to the embodiments of the present disclosure, a size of the second end 220 of the base body 200 along the second direction X-X is reduced, since the terminals 320 are arranged into m rows. By appropriate arrangement, the conductive traces 400 (for example, S3 and S4) can extend along a straight line or an approximately straight line and be electrically connected between the contact pads 310 and the terminals 320. In this way, there is no gap between the conductive traces 400 in the first direction Y-Y. Therefore, the base body 200 does not have to reserve room for it. Consequently, a size D4 of the second end 220 of the base body 200 along the first direction Y-Y may be reduced. In some embodiments, for a double density 0.80 mm connector, the size D4 of the second end 220 along the first direction Y-Y may be reduced to 5.5-7.5 millimeters. Further, D4 may be reduced to 6-7 millimeters. Even further, D4 may be reduced to about 6.5 millimeters. Moreover, the lengths of the conductive traces 400 are reduced, since the conductive traces 400 may extend in straight lines or approximately straight lines. In some embodiments, a length of S3 may be reduced to 13-14 millimeters, and a length of S4 may be reduced to 2.3-3.2 millimeters. Further, a length of S3 may be reduced to 13.3-13.8 millimeters, and a length of S4 may be reduced to 2-5-3.0 millimeters. Even further, a length of S3 may be reduced to about 13.5 millimeters, and a length of S4 may be reduced to about 2.8 millimeters.

Any signal distortion during the process of signal transmission by the electrical connector with the paddle card 100 may not be desired. If distortion occurs during signal transmission in the paddle card 100, communications between a circuit and another circuit which are connected by the paddle card 100 may be influenced. The electronic device may not detect signals correctly, or make more mistakes in detecting signals. Improving signal integrity of the paddle card 100 means less probability of occurrence of distortion during signal transmission through the electrical connector. In particular, distortion is more likely to occur when high-frequency signals are transmitted. Therefore, reducing the probability of distortion means that an electronic device with the electrical connector may operate at a higher frequency. In some embodiments, the electrical connector may satisfy requirement for PCIe Gen5 32 Gpbs.

As previously mentioned, multiple types of distortions may occur during signal transmission through the electrical connector using the paddle card 100. Reducing the lengths of the conductive traces 400 and increasing spacings between the conductive traces 400 may prevent signal distortions.

One type of distortion is crosstalk. When the electrical connector using the paddle card 100 transmits differential signals, the conductive traces 400 include differential pairs of conductive traces. In some embodiments, S1 and S2 in FIG. 2 may be a differential pair of conductive traces; and S3 and S4 in FIG. 5 may be a differential pair of conductive traces. A differential signal is substantially transmitted in one differential pair of conductive traces. However, some differential signals may reach adjacent differential pairs of conductive traces. A phenomenon of a differential signal coupled from a first differential pair of conductive traces to a second differential pair of conductive traces is referred to as crosstalk. Crosstalk may create a distortion in the signal intended to be carried by the second differential pair of conductive traces. The amount of crosstalk depends on the distance over which the first differential pair of conductive traces is routed in the proximity of the second differential pair of conductive traces. With reference to FIG. 2 and FIG. 5 in combination, an overlapping length of S1 and S2 (which is substantially equal to S1) is much greater than an overlapping length of S3 and S4 (which is substantially equal to S4). The overlapping length refers to the length of portions of the conductive traces that are too close to each other to cause crosstalk. Consequently, the electrical connector using the paddle card 100 has better anti-crosstalk performance.

Another type of distortion is signal attenuation. The longer the conductive traces 400 are, the more attenuation there is. Therefore, the electrical connector using the paddle card 100 has better anti-attenuation performance.

Yet another type of distortion is skew. As previously mentioned, for conventional electrical connectors, since lengths of S1, S2 and nearby conductive traces 13 are obviously different, differential inter-pair skew and differential intra-pair skew may be simultaneously present. However, in the electrical connector using the paddle card 100 illustrated in FIGS. 5, S3 and S4 may be made straight as well as the nearby conductive traces 400. Consequently, their lengths are substantially equal, i.e., lengths of two conductive traces in each differential pair of conductive traces are substantially equal. By comparison between adjacent differential pairs of conductive traces, the lengths of the conductive traces are also substantially equal. Consequently, skew substantially does not occur to signals transmitted through the electrical connector using the paddle card 100.

As described, the paddle card 100 may have smaller sizes in both the first direction Y-Y and the second direction X-X, which enables the miniaturization of an electrical connector incorporating the paddle card 100. The paddle card 100 can be widely used in an electronic system, and have less limitation in use. Materials used to make the conductive traces 400 and the base body 200 may also be saved, thereby reducing the costs for manufacturing the paddle card 100. Meanwhile, distortions, such as crosstalk, signals attenuation and signal skew, that appear during signal transmission can be effectively relieved by the paddle card 100, thus ensuring integrity of signal transmission.

In some embodiments, at least 85% of each conductive trace may be straight. Further, at least 90% of each conductive trace may be straight. In some embodiments, at least 95% of each conductive trace may be straight. As described below, ends of conductive traces 400 may be configured to be bent. In this arrangement, when the conductive traces 400 are used to transmit differential signals, two conductive traces 400 in each differential pair of conductive traces may be as close as possible and have relatively long distance from two adjacent differential pairs of conductive traces by means of the small amount of portions of the conductive traces 400 that are not straight. In this way, differential signals can be better coupled and crosstalk may be effectively prevented, which ensure the integrity of transmission of differential signals. In such instance, lengths of the straight portions of conductive traces 400 are also related to overall lengths of the conductive traces 400. One of skill in the art may select the lengths of the straight portions of the conductive traces 400 as required. Optionally, when the conductive traces 400 are used to transmit other kinds of signals, each of the conductive traces 400 may be completely straight. In this case, the conductive traces 400 may be made as short as possible, thereby improving integrity of signal transmission.

In some embodiments, angles of straight portions of the plurality of conductive traces 400 to the first direction Y-Y may be within a range of −10 degree to 10 degrees. With respect to other embodiments, such a configuration may enable the base body 200 to be more compact, thereby reducing a size of the base body 200. Further, conductive traces 400 may be parallel to the first direction Y-Y.

In some embodiments, the first direction Y-Y and the second direction X-X may be perpendicular to each other, which causes the base body 200 more compact in comparison to other angles. It may be more convenient for mounting the electrical connector, since the electrical connector is usually applied in relatively narrow space. In embodiments where an electrical connector needs to be regularly plugged or exchanged (for example, the electrical connector is a plug electrical connector), the electrical connector using the preferred paddle card 100 is more applicable.

In some embodiments, two conductive traces 400 of each differential pair of conductive traces may have equal length. With reference to FIG. 5, the two conductive traces 400 included in the differential pair of conductive traces S3 and the two conductive traces 400 included in the differential pair of conductive traces S4 may have equal length, respectively. In combination with the above-mentioned descriptions, intra-pair skew of two conductive traces 400 in each pair having the same length may reduce to the lowest, thus ensuring that signals transmitted by the electrical connector using the paddle card 100 have better integrity. S3 and S4 may also have the same length as their respective adjacent differential pair of conductive traces, respectively, so as to reduce inter-pair skew.

In some embodiments, as shown in FIG. 5, m=n. Each row of the m rows of contact pads 310 is correspondingly electrically connected to one row of the n row of terminals, respectively. Each row of contact pads 310 may be correspondingly electrically connected to one row of terminals 320. For instance, the first row of contact pads 310 may be electrically connected to the first row of terminals 320 through the conductive traces 400; and the second row of contact pads 310 may be electrically connected to the second row contact pads 320 through the conductive traces 400. Based on such structure, it is easy to manufacture the paddle card 100 by stacking and pressing. Therefore, the design and manufacturing costs of the paddle card 100 can be reduced.

Further, as illustrated in FIG. 5, along the first direction Y-Y, a row of contact pads 310 that is closer to the inside of the base body 200 is electrically connected to a row of terminals 320 that is closer to the inside of the base body 200. A row of contact pads 310 that is closer to the outside of the base body 200 is electrically connected to a row of terminals 320 that is closer to the outside of the base body 320. In the embodiment illustrated in the figure, the first row of contact pads 310 may be electrically connected to the second row of terminals 320, whereas the second row of contact pads 310 may be electrically connected to the first row of terminals 320. In this way, the conductive traces connecting the innermost row of the contact pads 310 and the innermost row of the terminals 320 have the shortest length. Therefore, an overlapping length of the conductive traces connecting contact pads in different rows may be the shortest. For example, the overlapping length of S3 and S4 may be reduced as short as possible. Therefore, the electrical connector using the paddle card 100 has better anti-crosstalk performance.

In some embodiments, the plurality of conductive traces 400 may be distributed in a plurality of layers, thereby forming a plurality of conductive trace layers (not shown). A number of layers of conductive trace layers may be of 2, 3 or more. Optionally, the number of layers of conductive trace layers may be the same as a number of rows of contact pads 310 or a number of rows of terminals 320. The number of layers of the conductive trace layers may be different from the number of rows of contact pads 310 or the number of rows of terminals. In some embodiments, as illustrated in FIG. 5, when numbers of rows of both the contact pad 310 and the terminal 320 are 2, the number of layers of conductive traces 400 may be 6, 7, 8, 9, or 10. The first direction Y-Y and the second direction X-X may be parallel to the conductive trace layers. In some embodiments, with reference to FIG. 5, the plurality of conductive trace layers may be spaced along a vertical direction Z-Z of the base body 200. Spacings between the plurality of conductive trace layers may be the same or different.

In some embodiments, in the embodiment that the base body 200 is a printed circuit board, the printed circuit board may be fabricated by pressing a plurality of sheets together. Each sheet may have a polymer substrate (for example, epoxy). A metal layer is deposited on a side of the sheet and then patterned to form the conductive traces 400. A plurality of such sheets are stacked and then pressed at a high temperature to fuse these sheets together, thereby the base body 20 and conductive traces 400 disposed inside the base body 200 may be formed. It is easy to lower the level of difficulty in manufacturing the paddle card 100 and optimize the manufacturing process of the paddle card 100 by forming a plurality of conductive trace layers. A grounding layer (not shown) may be disposed between the conductive trace layers. In this way, crosstalk between the conductive traces 400 on adjacent conductive trace layers may be reduced. Therefore, the paddle card 100 has better anti-crosstalk performance. One of skill in the art can select the number of layers of the conductive trace layers as required.

In some embodiments, as illustrated by FIG. 5, a contact pads 310 and a terminals 320 connected to each other through one same conductive trace 400 may be aligned along the first direction Y-Y. In this way, the conductive trace 400 may be parallel to the first direction Y-Y, thereby the length of the conductive trace 400 may be shortened as possible. Signals transmitted by the electrical connector using the paddle card 100 have better integrity.

In some embodiments, as illustrated in FIG. 5, each of the plurality of conductive traces 400 comprises a first connecting end 410, a second connecting end 420 and an intermediate section 430. The intermediate section 430 connects the first connecting end 410 with the second connecting end 420. The first connecting end 410 and the second connecting end 420 may be the same or different. The first connecting end 410 may be electrically connected to the contact pad 310. The second connecting end 420 may be electrically connected to the terminal 320. The intermediate section 430 may be straight. In the embodiment illustrated in the figures, the first connecting end 410 and the second connecting end 420 are bent. In other embodiments that are not illustrated, the first connecting end 410 and the second connecting end 420 may also be straight. In some embodiments, a length of the intermediate section 430 may be at least 85% of the overall length of the conductive trace 400. In some embodiments, the length of the intermediate section 430 may be at least 90% of the overall length of the conductive trace 400. More In some embodiments, the length of the intermediate section 430 may be at least 95% of the overall length of the conductive trace 400. By disposing the first connecting end 410 and the second connecting end 420, intermediate sections 430 of the two conductive traces in each differential pair of conductive traces may be made to be as close as possible, and have relatively long distance from intermediate sections 430 of two adjacent differential pairs of conductive traces. Differential signals will be better coupled, and crosstalk may be effectively prevented. Thereby the paddle card 100 can have better performance.

Figure 3:
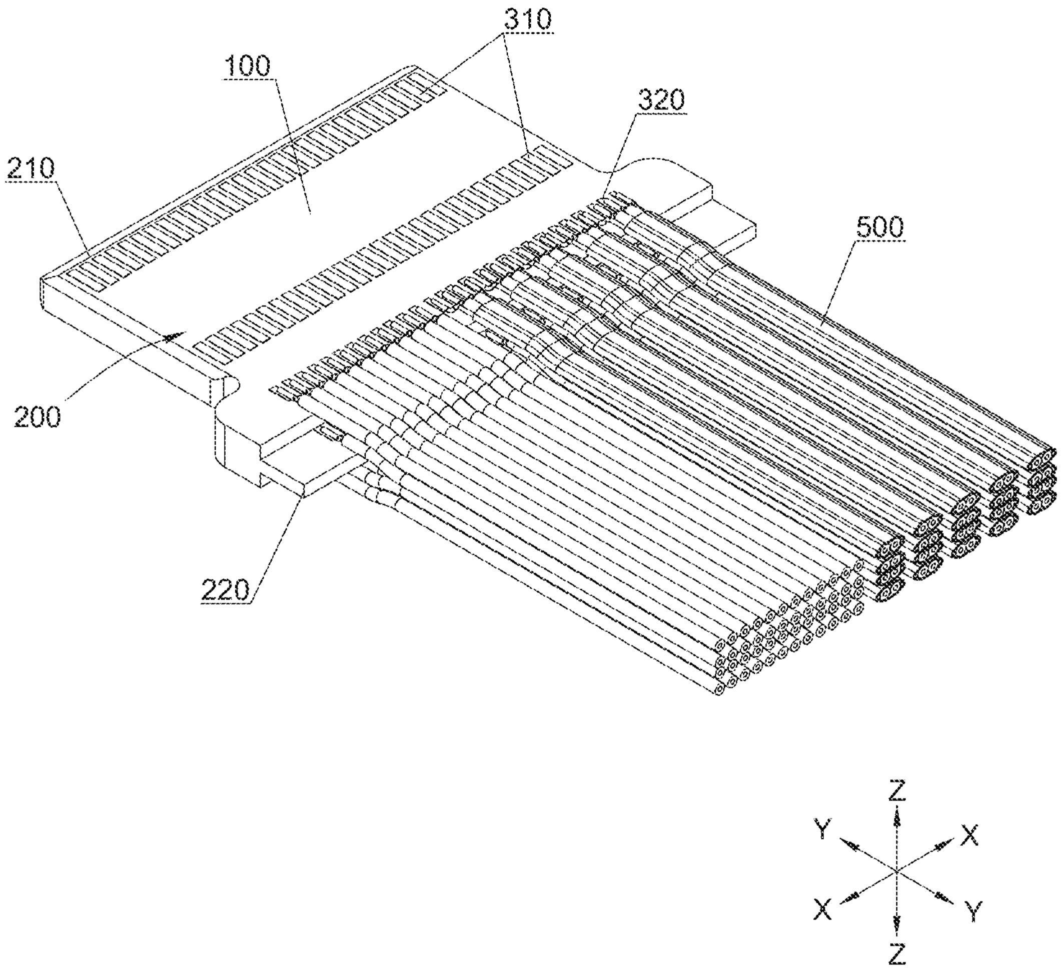
FIG. 3 is a perspective view of a portion of an electrical connector, according to some embodiments.
Figure 4:
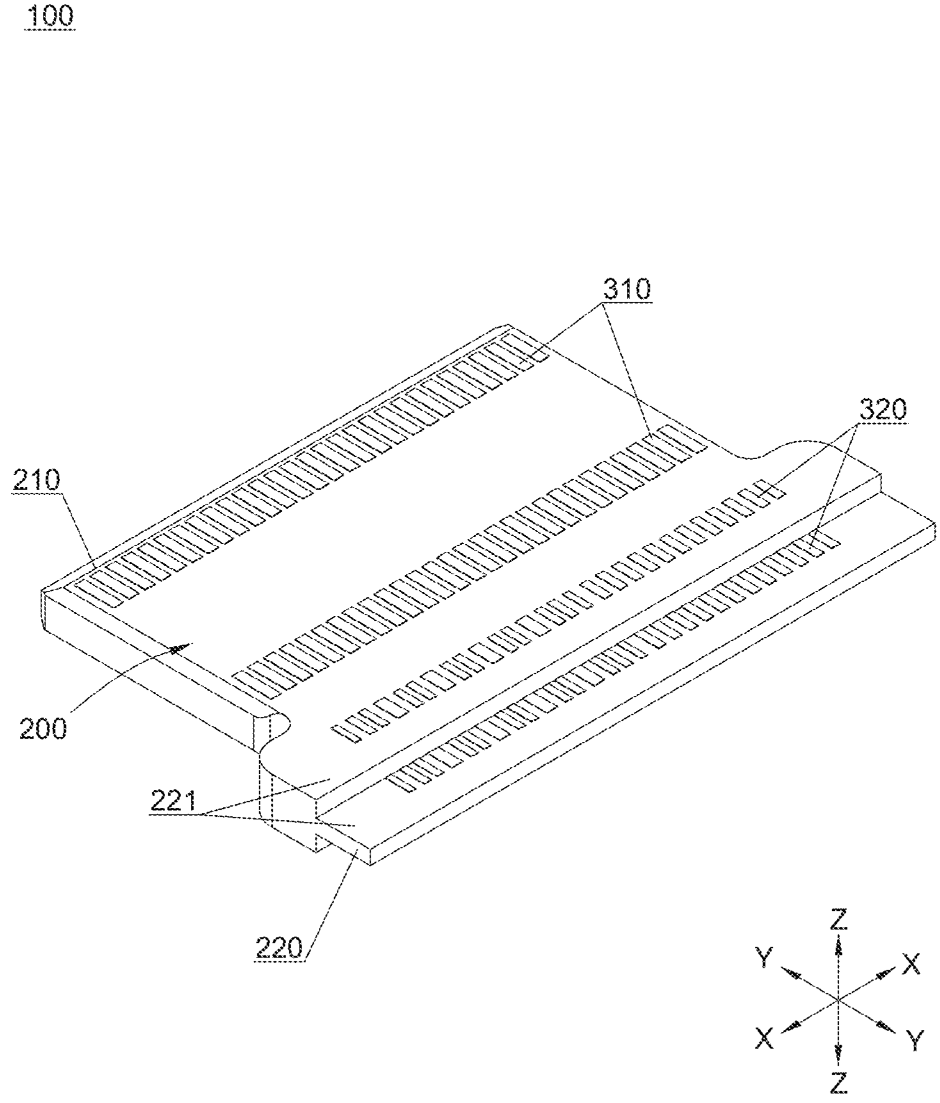
FIG. 4 is a perspective view of a paddle card of the portion of the electrical connector of FIG. 3.
Figure 8:
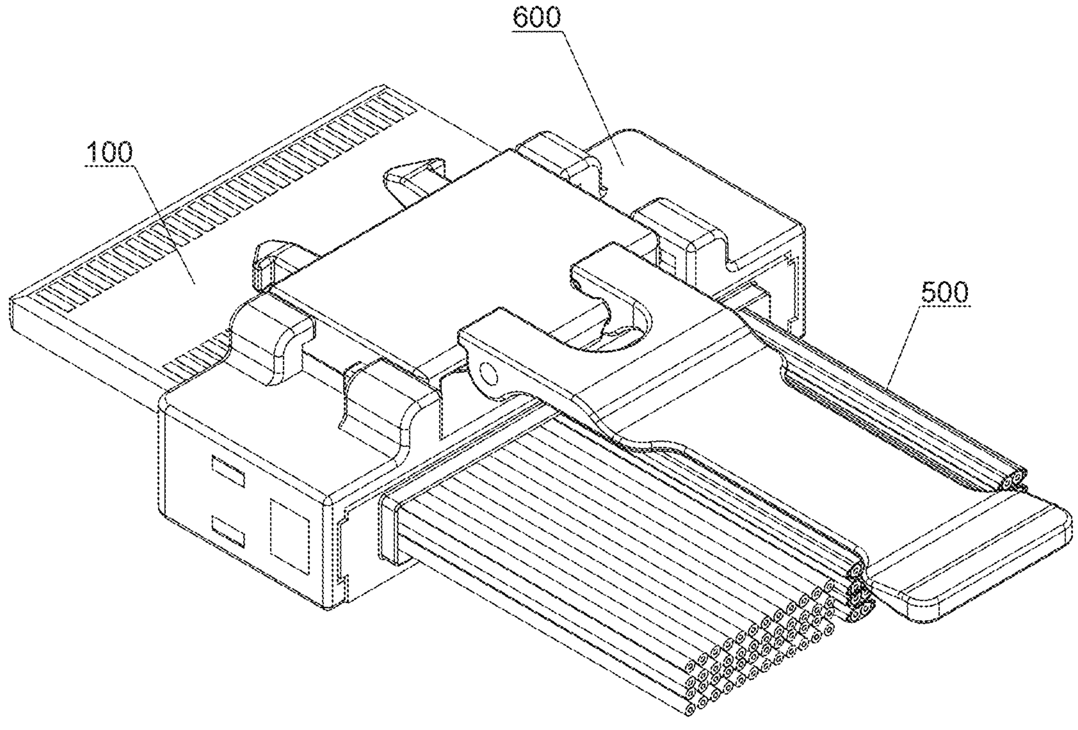
FIG. 8 is a perspective view of an electrical connector, according to some embodiments.
Figure 9:
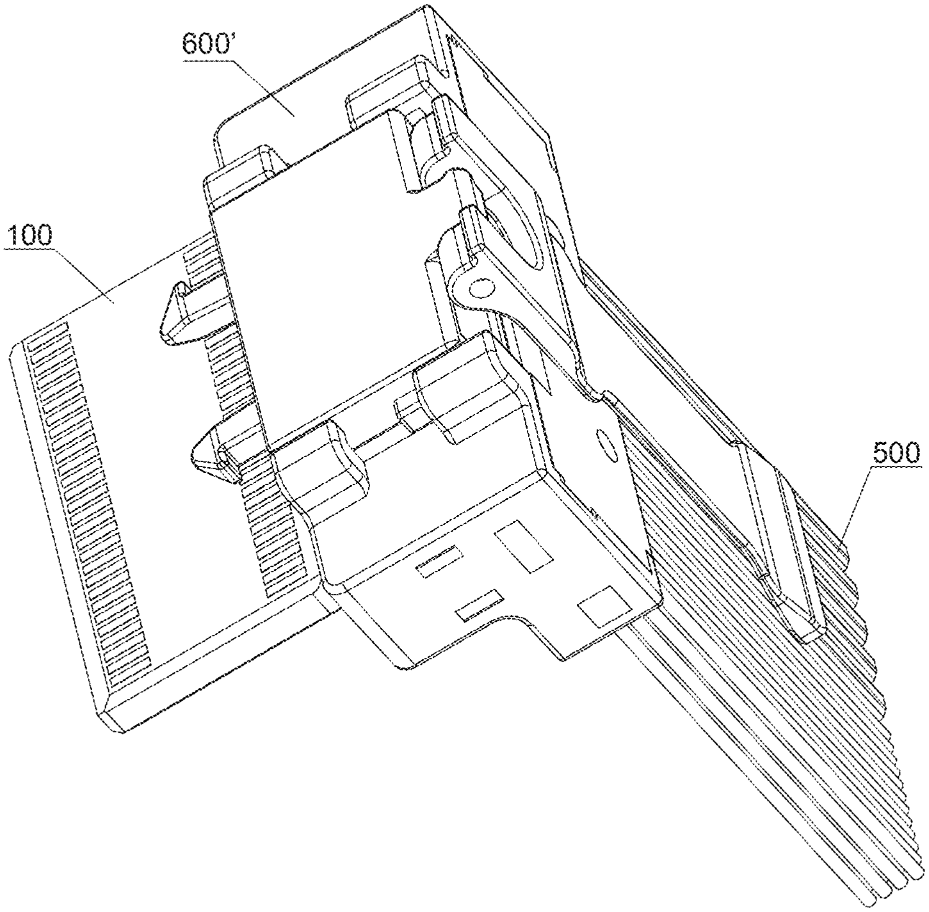
FIG. 9 is a perspective view of another electrical connector, according to some embodiments.

In some embodiments, as shown in FIG. 3, then rows of contact pads 310 may be gold fingers. That is to say, the paddle card 100 may be a gold finger paddle card. Types and specifications of the gold fingers may be unlimited, for example, gold fingers for transmitting power signals, gold fingers for transmitting control instruction signals, etc. The m rows of terminals 320 may be used to connect cables 500. The types and specifications of cables 500 may be unlimited, e.g., cables transmitting high-speed signals, cables transmitting power signals, etc. The other ends of the cables 500 may be connected to other circuit. The gold finger paddle card has a quite wide application. By disposing the cables 500, the paddle card 100 may be remotely connected to the circuit connected to the other ends of the cables 500. With reference to FIGS. 8-9 in combination, since cables 500 generally have certain flexibility, by changing an extending direction of cables 500, the paddle card 100 may be configures as a coplanar paddle card, a vertical paddle card or other any suitable paddle card. Therefore, the paddle card 100 can be widely used and have higher practicability. In other embodiments, the m rows of terminals 320 may connect pins or any other suitable housing assembly.

In some embodiments, as shown in FIG. 5, the second end 220 of the base body 200 may be in stair-step shape. A row of terminals 320 may be disposed on each stair-step 221. In this way, the terminals 320 in different rows are positioned on different planes. When the terminals 320 connect the cables 500 or other housing assembly, terminals 320 being on different planes provides larger space to facilitate a connecting process such as welding. Therefore, the manufacturing processes for the paddle card 100 are optimized.

Figure 6:
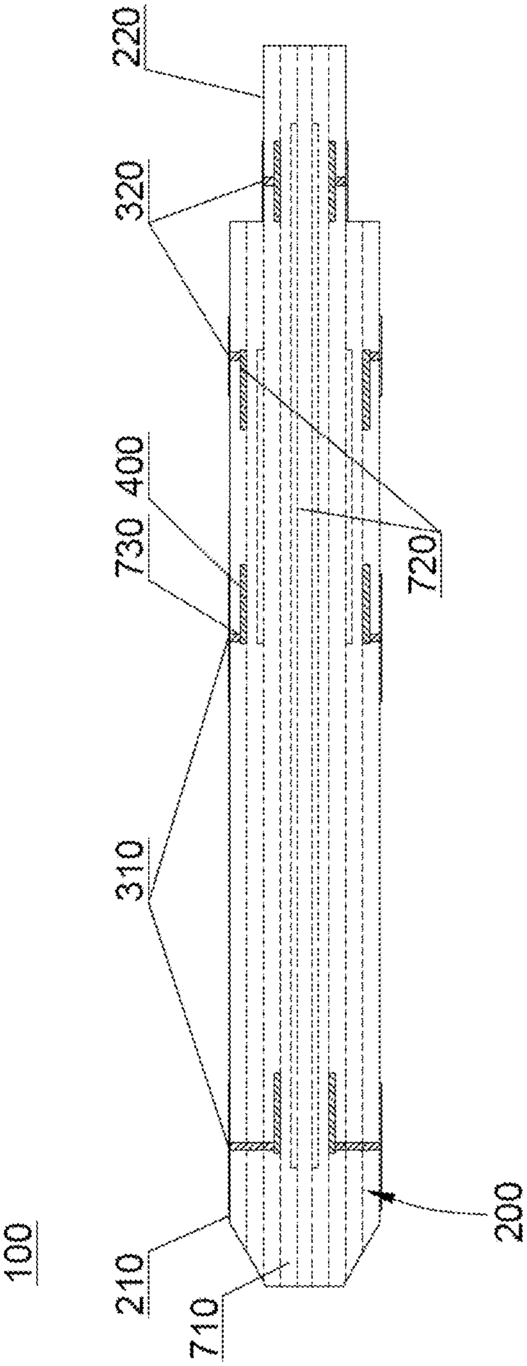
FIG. 6 is a cross-sectional view of the paddle card of FIG. 4.
Figure 7:
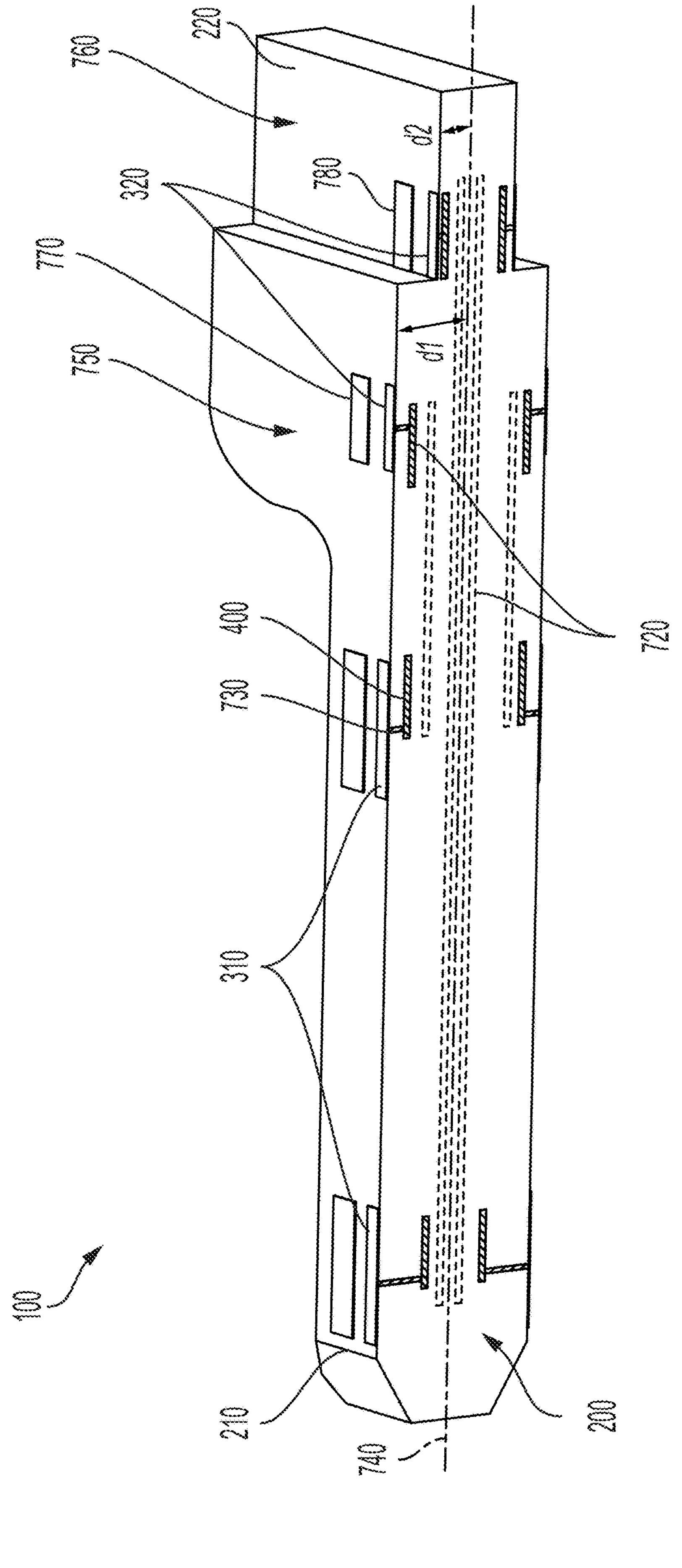
FIG. 7 is a perspective view of the paddle card of FIG. 6, showing the cross-section of FIG. 6.

In an embodiment where the paddle card 100 is manufactured by stacking and pressing, with reference to FIGS. 6-7, a plurality of dielectric layers 710 and a plurality of patterned metal layers 720 that are alternatively laminated may be included. A patterned metal layer 720 is disposed between each two adjacent dielectric layers 710. Adjacent patterned metal layers 720 are separated by a dielectric layer 710. These dielectric layers 710, together with the patterned metal layers 720, may be referred to as main body. The main body may comprise other components thereon. A centerline 740 may separate the paddle card 100 into two halves. The paddle card may have a first surface 750 having a first row 770 of terminals and spaced from the centerline 730 by a first distance d1. The paddle card may have a second surface 760 facing a same direction as the first surface 750 and spaced from the centerline 730 by a second distance d2 and comprising a second row 780 of terminals. As illustrated, the second distance d2 may be smaller than the first distance d1.

The plurality of patterned metal layers 720 may comprise outer patterned metal layers positioned on surfaces of the outermost dielectric layers 710 and inner patterned metal layers positioned between adjacent dielectric layers 710. The inner patterned metal layers may be connected to the outer patterned metal layers through conductive vias 730. The outer patterned metal layers may form n rows of contact pads 310 and m rows of terminals 320. The n rows of contact pads 310 and m rows of terminals 320 may be positioned on two ends 210 and 220 of the base body that are opposing along a first direction Y-Y, respectively. The outer patterned metal layers forming different rows of terminals are positioned on different layers.

In some embodiments, the inner patterned metal layers may comprise a plurality of conductive traces 400. The two ends of the plurality of conductive traces 400 may be connected to the n rows of contact pads 310 and the m rows of terminals 320 through the conductive vias 730, respectively. In order to show the manufacturing of the paddle card 100 by stacking, as illustrated by FIG. 6, the plurality of dielectric layers 710 are separated by dotted lines, while these dotted lines may not be present or not be so clearly present in actual products, as illustrated in FIG. 7. In addition, in order to show that the surface of each dielectric layer 710 has a metal layer formed thereon, potential metal layers that may not be presented on the cutting planes, such as the metal layers illustrated by dotted box, are imaginarily illustrated in FIGS. 6-7.

According to yet another aspect of the present disclosure, a method for manufacturing a paddle card is further provided. The method comprises: first, forming a metal layer on a dielectric layer 710; patterning the metal layer to form a patterned metal layer; then stacking a plurality of dielectric layers 710 each provided with a patterned metal layer thereon, and joining the plurality of dielectric layers 710 together to form a main body. Outer patterned metal layers positioned on surfaces of the main body form n rows of contact pads 310 and m rows of terminals 320. Then rows of contact pads 310 and them rows of terminals 320 are positioned on the two ends of the main body, respectively.

In some embodiments, the outer patterned metal layers forming different rows of terminals are positioned on different layers.

In some embodiments, inner patterned metal layers positioned in the main body comprise a plurality of conductive traces 400. The method further comprises: forming conductive vias 730 on the dielectric layers 710 to connect two ends of the plurality of conductive traces 400 to the n rows of contact pads 310 and the m rows of terminals 320, respectively.

According to yet another aspect of the present disclosure, an electrical connector is further provided, as illustrated in FIG. 8. The electrical connector may comprise a paddle card 100, cables 500 and a housing assembly 600. As shown in FIGS. 3-5 and 8 in combination, m rows of terminals 320 may connect m rows of cables 500, and the housing assembly 600 encloses the second end of the base body 200 and connecting ends of the cables 500 connected to the terminals 320. The housing assembly 600 may comprise a housing for protecting the paddle card 100, a connection lock for connecting to other circuits (for example, a mating electrical connector) or other types of components that are already known by one of skill in the art or may appear in the future. Different types of electrical connectors may be formed by manufacturing the housing assembly 600 into different structures. A coplanar electrical connector is shown in FIG. 8. When a housing assembly 600' is configured in an L shape illustrated in FIG. 9, a right-angled electrical connector may be formed.

Figure 10:
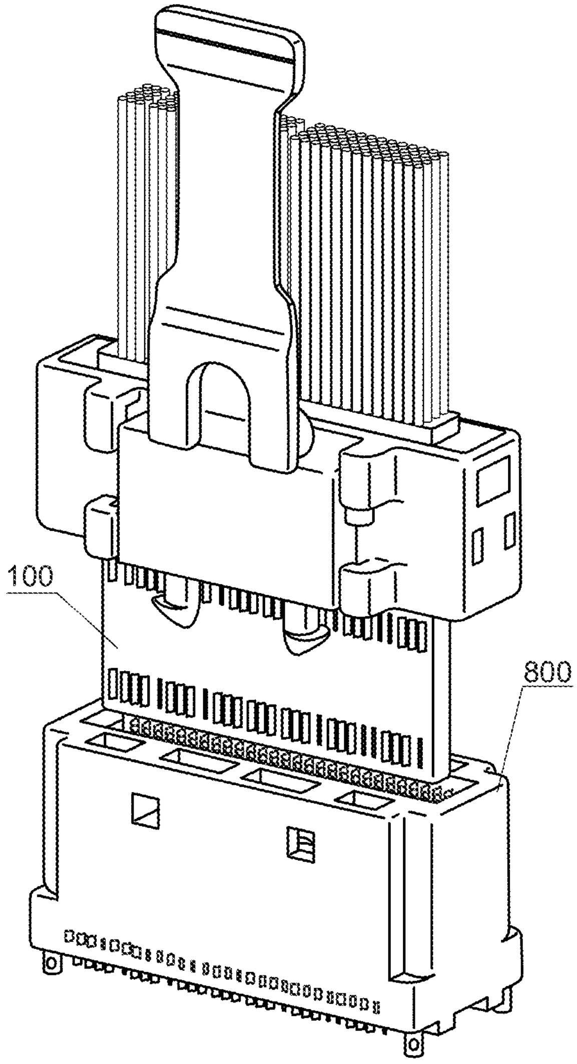
FIG. 10 is a perspective view of an electrical connector assembly, showing a plug electrical connector and socket electrical connector in an unmated state, according to some embodiment.
Figure 11:
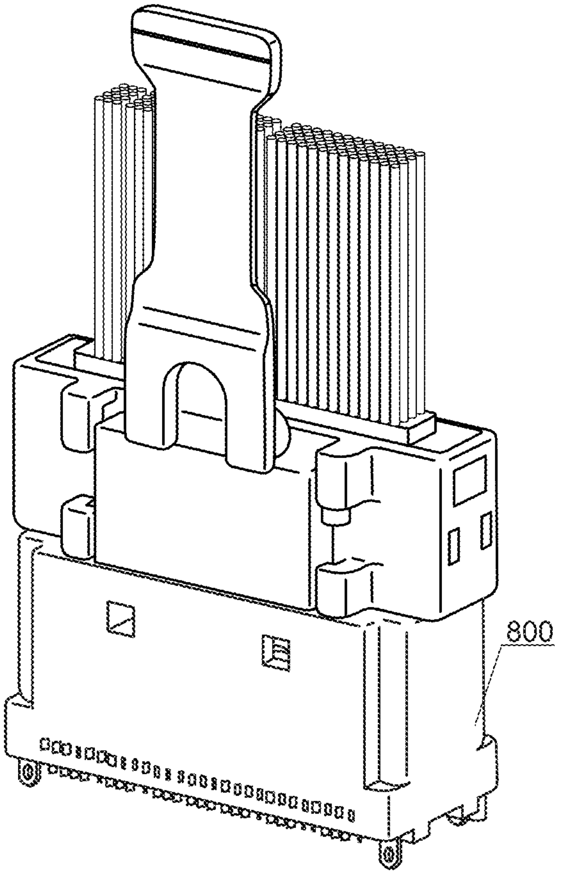
FIG. 11 is a perspective view of the electrical connector assembly of FIG. 10, showing the plug electrical connector and socket electrical connector in a mated state.

In some embodiments, the electrical connector having the paddle card 100 may be attached to and detached from a mating electrical connector 800 by means of a housing assembly. With reference to FIG. 10, the paddle card 100 and the mating electrical connector 800 are separated, and the two cannot achieve electrical coupling. With reference to FIG. 11, by using a connecting lock on the housing assembly 600, the electrical connector with the paddle card 100 may be attached with the mating electrical connector 800, thereby achieving reliable electrical connection between the paddle card 100 and the mating electrical connector 800.

Therefore, the present disclosure has been described in way of the above several embodiments. It should be understood that a person skilled in the art can make more variations, modifications and improvements based on the teachings of the present disclosure, and these variations, modifications and improvements shall fall within the spirit and the protection scope of the present disclosure. The protection scope of the present disclosure is defined by the appended claims and their equivalent scopes. The foregoing embodiments are only for the purpose of illustration and description, and are not intended to limit the present disclosure to the scope of the described embodiments.

Various changes may be made to the illustrative structures shown and described herein. For example, the paddle card may be used to any suitable electrical connector, such as card edge connecter, backplane connector, daughter card connector, stacking connector, Mezzanine connector, I/O connector, chip socket, Gen Z connector, etc.

Furthermore, although many inventive aspects are shown and described with reference to a plug electrical connector, it should be appreciated that aspects of the present disclosure is not limited in this regard. As mentioned, any of the inventive concepts, whether alone or in combination with one or more other inventive concepts, may be used in other types of electrical connectors, such as right angle connectors, coplanar electrical connectors, etc.

In the description of the present disclosure, it needs to be understood that the orientation or positional relationship indicated by the orientation terms such as “front”, “rear”, “upper”, “lower”, “left”, “right”, “transverse”, “vertical”, “perpendicular”, “horizontal”, “top”, “bottom”, etc. is usually based on the orientation shown in the drawings, and is only for the convenience of describing the present disclosure and simplifying the description. These orientation terms do not indicate or imply that the device or element has to have a specific orientation or be constructed and operated in a specific orientation, except as otherwise noted. Therefore, they cannot be understood as a limitation on the scope of the present disclosure. The orientation terms, “inside” and “outside”, refer to the inside and outside relative to the contour of each component itself.

For ease of description, spatial terms, such as “above”, “on”, etc., can be used herein to describe the spatial relationship between one or more components or features shown in the drawings and other components or features. It should be understood that the spatial terms not only include the orientation of the components shown in the drawings, but also include other orientations in use or operation. For example, if the components in the drawings are inverted as a whole, a component “above other components or features” becomes to the component “below other a components or structures”. Thus, the exemplary term “above” can include both orientations “above” and “below”. In addition, these components or features can also be positioned at other different angles (for example, rotated by 90 degrees or other angles), and this disclosure intends to cover all of these situations.

It should be noted that the terms used herein are only for describing specific implementations, and are not intended to limit to the exemplary implementations according to the present application. As used herein, unless the context clearly indicates otherwise, the singular form is also intended to include the plural form. In addition, the use of “including”, “comprising”, “having”, “containing”, or “involving”, and variations thereof herein, is meant to encompass the items listed thereafter (or equivalents thereof) and/or as additional items.

It should be noted that the terms “first” and “second” in the description, the claims and the drawings of the application are used to distinguish similar objects, and are not necessarily used to describe a specific sequence. It should be understood that numbers used in this way can be interchanged under appropriate circumstances such that the embodiments of the present disclosure described herein can be implemented in a sequence other than those illustrated or described herein.

What is claimed is:

1. A paddle card, comprising:

a first surface comprising a first row of terminals for connection to respective first cables, the first row of terminals spaced, by a first distance, from a plane that a centerline of the paddle card extends in parallel to the first surface;

a second surface facing a same direction as the first surface and spaced, by a second distance different from the first distance, from the plane that the centerline of the paddle card extends, the second surface comprising a second row of terminals for connection to respective second cables;

a first plurality of conductive traces connecting the first row of terminals to a first row of contact pads spaced from the first row of terminals by a third distance; a second plurality of conductive traces connecting the second row of terminals to a second row of contact pads spaced from the first row of terminals by a fourth distance, different from the third distance and partially overlapping with respective ones of the first plurality of conductive traces, wherein:

the first plurality of conductive traces are shorter than respective ones of the second plurality of conductive traces.

2. The paddle card of claim 1, wherein: the first surface comprises the first row of contact pads and the second row of contact pads.

3. The paddle card of claim 1, wherein:

the first plurality of conductive traces comprise pairs of conductive traces for transmitting differential signals; and the conductive traces of each pair of the first plurality of conductive traces have equal lengths.

4. The paddle card of claim 3, wherein:

the second plurality of conductive traces comprise pairs of conductive traces for transmitting differential signals, and the conductive traces of each pair of the second plurality of conductive traces have equal lengths.

5. The paddle card of claim 3, wherein:

each of the first plurality of conductive traces and second plurality of conductive traces comprises a first contact end, a second contact end and an intermediate portion between the first contact end and the second contact end, the first contact end is electrically connected to a contact pad, the second contact end is electrically connected to a terminal, and the intermediate portion is straight.

6. The paddle card of claim 3, wherein each of the first plurality of conductive traces and second plurality of conductive traces is straight along at least 85% of its length.

7. The paddle card of claim 6, wherein angles between straight portions of the first and second pluralities of conductive traces and respective lines parallel to the centerline are within a range of-10 degrees to 10 degrees.

8. The paddle card of claim 3, comprising:

a plurality of metal layers, wherein the first and second pluralities of conductive traces are distributed in the plurality of metal layers.

9. The paddle card of claim 2, wherein: the first row of contact pads is disposed closer to the first row of terminals than, the second row of contact pads.

10. The paddle card of claim 3, wherein the first and second pluralities of conductive traces comprise a conductive trace electrically connecting a contact pad and a terminal that are aligned to each other.

11. A paddle card, comprising:

a main body comprising a plurality of dielectric layers and a plurality of metal layers disposed between adjacent dielectric layers of the plurality of dielectric layers;

a first plurality of rows of contact pads disposed on a first surface of the main body;

a second plurality of rows of terminals, the first plurality of rows of contact pads and the second plurality of rows of terminals disposed on two opposite ends of the main body, respectively;

a first plurality of conductive traces in a first metal layer of the plurality of metal layers, the first plurality of conductive traces connecting a first row of the plurality of rows of contact pads to a first row of the second plurality of rows of terminals, the first row of the second plurality of rows of terminals disposed on the first surface of the main body; and a second plurality of conductive traces in a second metal layer of the plurality of metal layers different from the first metal layer, the second plurality of conductive traces connecting a second row of the first plurality of rows of contact pads to a second row of the second plurality of rows of terminals, the second row of the second plurality of rows of terminals disposed on a second surface of the main body different from the first surface.

12. The paddle card of claim 11, wherein:

the first plurality of conductive traces comprise pairs of conductive traces for transmitting different signals, and conductive traces of each pair of conductive traces of the second plurality of conductive traces have equal lengths.

13. The paddle card of claim 12, wherein:

the second plurality of conductive traces comprise pairs of conductive traces for transmitting differential signals, and conductive traces of each pair of conductive traces of the second plurality of conductive traces have equal lengths.

14. The paddle card of claim 12, wherein each of the first plurality of conductive traces and second plurality of conductive traces is straight along at least 85% of its length.

15. The paddle card of claim 11, wherein:

the first plurality of rows of contact pads are coupled through the paddle card to the second plurality of rows of terminals.

16. A cable assembly, comprising:

a paddle card comprising:

a leading edge, a trailing edge spaced from the leading edge in a longitudinal direction, a plurality of contact pads comprising a first row of contact pads along the leading edge and a second row of contact pads spaced from the first row in the longitudinal direction, and a plurality of terminals comprising a third row of terminals along the trailing edge and a fourth row of terminals spaced from the third row in a direction opposite the longitudinal direction, wherein:

the third row of terminals is offset from the fourth row of terminals in a transitional direction perpendicular to the longitudinal direction;

a plurality of conductive traces electrically connecting the first row of contact pads with the third row of terminals and electrically connecting the second row of contact pads with the fourth row of terminals;

a first plurality of cables electrically connected to terminals in the third row; and a second plurality of cables electrically connected to terminals in the fourth row.

17. The cable assembly of claim 16, wherein:

the plurality of conductive traces comprise pairs of conductive traces for transmitting differential signals; and conductive traces of each pair of conductive traces of the plurality of conductive traces have equal lengths.

18. The cable assembly of claim 16, wherein:

the plurality of terminals comprise a fifth row of terminals along the trailing edge and a sixth row of terminals spaced from the fifth row in the direction opposite the longitudinal direction, the paddle card comprises a plurality of metal layers, and the third, fourth, fifth, and sixth rows of terminals are disposed on different ones of the plurality of metal layers.

19. The cable assembly of claim 18, comprising:

a third plurality of cables electrically connected to terminals in the fifth row; and a fourth plurality of cables electrically connected to terminals in the sixth row.

20. The cable assembly of claim 16, comprising:
a housing at least partially enclosing the paddle card.

* * * * *